F. G. BUTLER,

Assignor to THE VERMONT FARM MACHINE COMPANY.

MILK SETTING APPARATUS.

No. 10,357. Reissued July 17, 1883.

Witnesses:
Walter H. Bunce.
Albert L. Tanner

Inventor:
Francis G. Butler.
By W. E. Simonds
Attorney

UNITED STATES PATENT OFFICE.

FRANCIS G. BUTLER, OF WEST HARTFORD, CONNECTICUT, ASSIGNOR TO THE VERMONT FARM MACHINE COMPANY, OF BELLOWS FALLS, VERMONT.

MILK-SETTING APPARATUS.

SPECIFICATION forming part of Reissued Letters Patent No. 10,357, dated July 17, 1883.

Original No. 194,510, dated August 28, 1877; Reissue No. 8,724, dated May 27, 1879; Reissue No. 9,302, dated July 20, 1880.
Application for reissue filed August 31, 1882.

*To all whom it may concern:*

Be it known that I, FRANCIS G. BUTLER, of West Hartford, in the county of Hartford and State of Connecticut, have invented certain new and useful Improvements in Apparatus for Setting Milk for Raising Cream; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My improvements relate to the raising of cream from milk placed in closed vessels; and they consist in a novel means for excluding the air and all foreign and deleterious matters and gases from the milk, and also in a simple means of ascertaining when all the milk has been drawn off from the vessel, so as then to stop the flow and leave the cream alone in the vessel, all in connection with cooling the milk while raising the cream.

In the William Cooley method of setting and raising cream his cans are placed in water at a low temperature and the covers positively held down on the can by weights or fastenings, and the cans then placed in water, which may be deep enough to entirely submerge the can. I avail myself of the covered can and the cooling of the filled can by depositing the same in water; but in order to secure an equalization of temperature to the inclosed milk I do not entirely submerge the covered can, nor need the water in the tank reach up to the bottom line of the can cover, but, on the contrary, I employ a hood or outer cover of fibrous or textile or kindred material—such as felt, blanketing, &c.—which is capable of readily absorbing and drawing up water by capillary attraction, so as to become saturated therewith.

Figure 1:
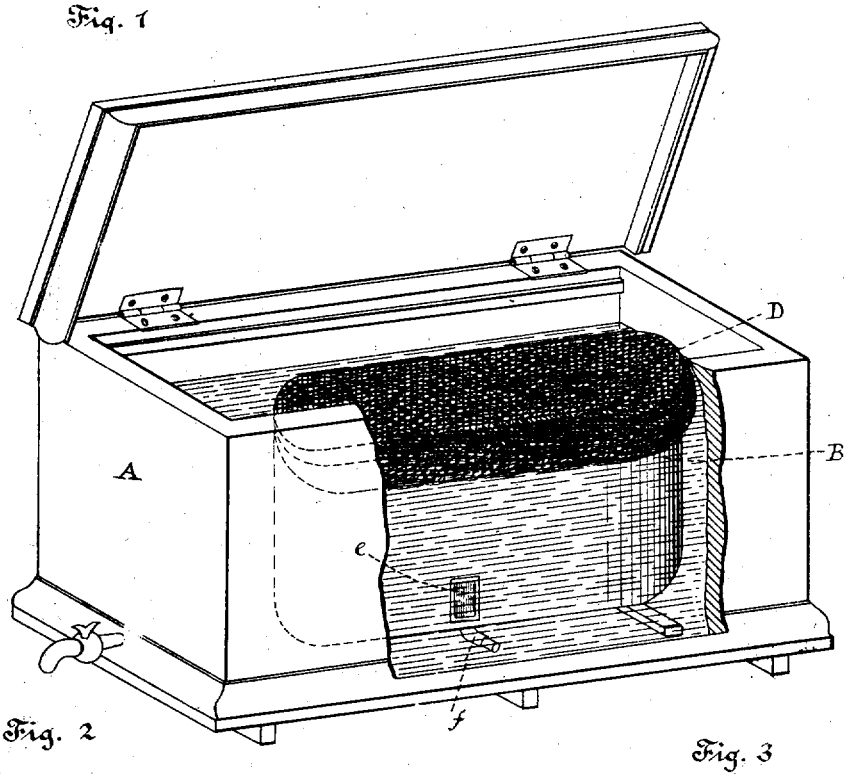
Figure 2:
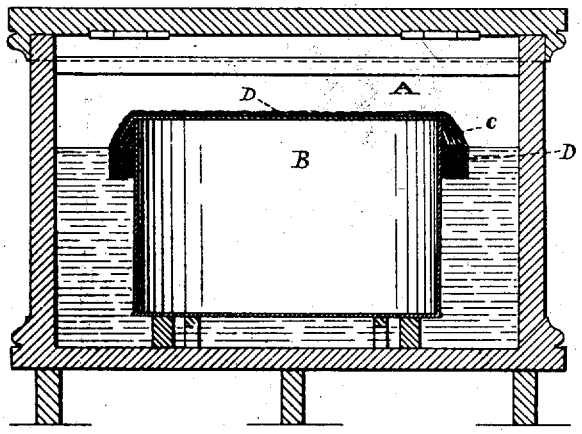
Figure 3:
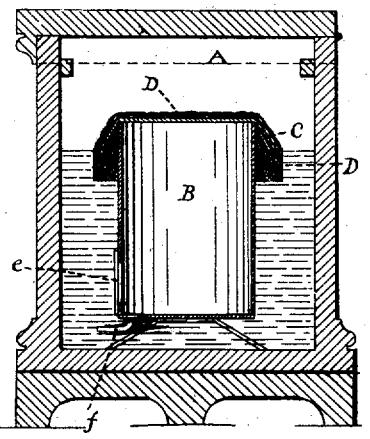
Figure 4:
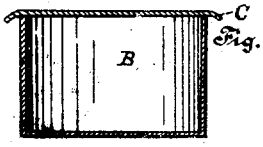

To describe my invention more fully I refer to the drawings, which illustrate one form of simple apparatus for practicing the same, Figure 1 being a perspective view, Figs. 2 and 3 vertical sections, and Fig. 4 a detail showing a modified form of cover.

A is an outer tank, vessel, or box for holding water, and also for receiving the milk vessel or can B; and it is provided with a lid by which it may be closed, and preferably has an outlet or spigot to facilitate the running off of the water when desired. The milk-vessel B may be of any appropriate material—say tin—and of any desired shape, but preferably cylindrical, and its cover C may be of any kind so long as it be capable of shedding water, so as not to allow it to drop into the milk. Over this cover I place a fibrous or kindred textile material, D,—for example, a felted, woven, or knitted goods—which may be secured to the cover, and of sufficient size to permit its lower edges to drop into the water within the tank, this cover forming a sort of hood, whose edges reach downward into the water.

When the milk has been placed in its can and the latter placed in the tank, either before or after the cool water (preferably about 45° Fahrenheit) has been put into it and the cover put on, and the felt or other absorbent has its lower edge in the water and the hood applied, which may be previously wetted—say by the act of pouring the water into the tank—it will be seen that by capillary attraction the hood D will be kept constantly wet, thus giving an even temperature to the entire can and perfectly excluding from the inclosed milk all foreign matter and atmospheric influences. A blanket laid over the cover and dipping into the water will produce the same effect, and if the tank be large enough one blanket may serve for a number of cans.

As before remarked, by this improved method the total immersion of the can and its cover under water or the filling of the tank up to and above the lower line of the cover, and the need of a weight or other device to fasten the cover down are not necessary, and less labor is used in supplying or disposing of the water.

I draw off the milk from below the raised cream by means of an outlet at or near the bottom of the can on the same general principle as in the Cooley process, leaving the cream in the can; but instead of an adjusting tube or device, previously adjusted to automatically arrest the flow when the milk has all been discharged, I place in the vertical wall of the can a small pane of glass, mica, or other translucent material, *e*, made water-tight and near to the outlet or cock *f*. Now, when the cream is raised, (which is greatly accelerated, under the closed and cooling process,) and it is desired to draw off the milk from beneath this body of cream, the outlet at *f* is opened and the milk drawn off as gradually as may be desired without agitating or disturbing the cream, and when the cream becomes visible through the pane *e* and its lower line has descended till it reaches the bottom of the can, the outlet or stop-cock *f* is closed, the flow of milk is cut off, and all the cream remains. The cream alone may now be either drawn off into another vessel or may be emptied from the can.

The can may stand on feet or on slats, if desired.

It will be observed that the outlet *f* is non-central in its location as regards the bottom of the milk-vessel—an arrangement thereof that avoids any tendency to cause a whirlpool or other undue agitation in the centents of the vessel. This arrangement also permits the bringing of the outlet and the transparent pane into suitable juxtaposition.

It will also be observed that the outlet of the milk-vessel is at or below the bottom line of the vessel—an arrangement which allows the milk to be all drawn out in separating the cream from the milk without canting the vessel sidewise, which canting would tend to mix the milk and the cream.

The milk-vessel, as above mentioned, may be of any appropriate material, by which I do not mean that it may be of any and all materials, but that it shall be made of some material which, like tin-plate, permits the ready passage of heat, and is practically suitable for use in a dairy. This limitation is expressed in the following claim by the use of the words "tin-plate or equivalent material."

I claim as my improvement—

1. In an apparatus for raising cream from milk, the combination of the milk-vessel and its cover, the external water-holding tank for cooling it, and an outer cover made of material adapted to serve as an absorbent and retainer of water, all substantially as described, and for the purposes set forth.

2. In an apparatus for raising cream upon and separating it from milk, the combination of the vessel to hold the milk, the open-top cooling-tank to cool it, the outlet in the milk-vessel at or below its bottom line for drawing off the milk from beneath the cream, and the translucent pane at the bottom part of the milk-vessel for the ascertainment of the proper time to close the outlet, all substantially as described, and for the purposes set forth.

3. In an apparatus for raising cream upon and separating it from the milk, the combination of the milk-vessel of tin-plate or equivalent material to hold the milk, the cooling-tank to cool it, the non-central outlet in the milk-vessel at or below its bottom line for drawing off the milk from beneath the cream, and the translucent pane at the bottom part of the milk-vessel for the ascertainment of the proper time to close the outlet, all substantially as described, and for the purposes set forth.

FRANCIS G. BUTLER.

Witnesses:
CHAS. L. BURDETT,
C. C. FULLER.